INVENTOR.
CHARLES FERSTENBERG
BY
Ward, Haseltine, McElhannon, Brooks & Fitzpatrick
ATTORNEYS United States Patent Office 3,729,534
Patented Apr. 24, 1973

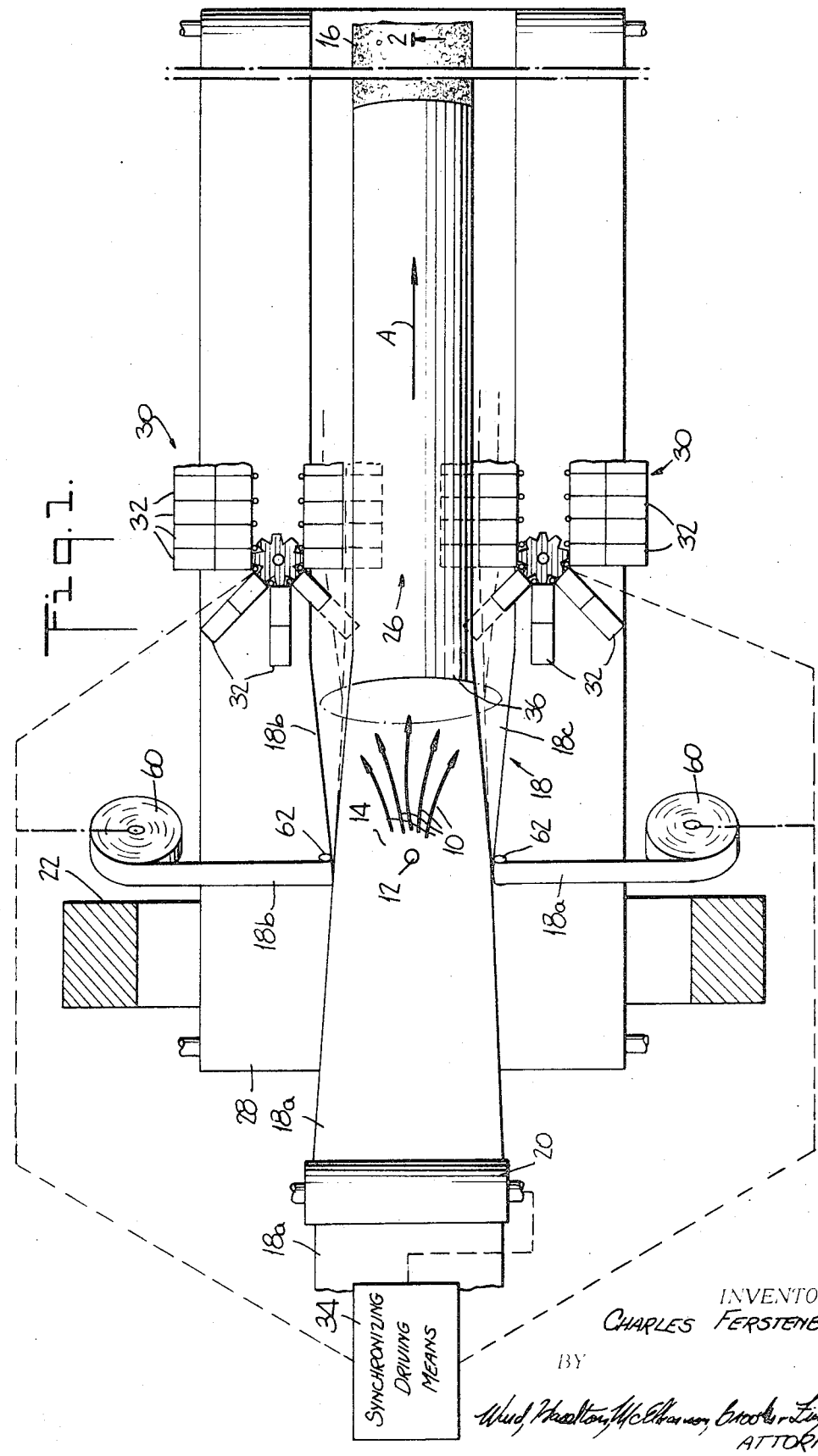

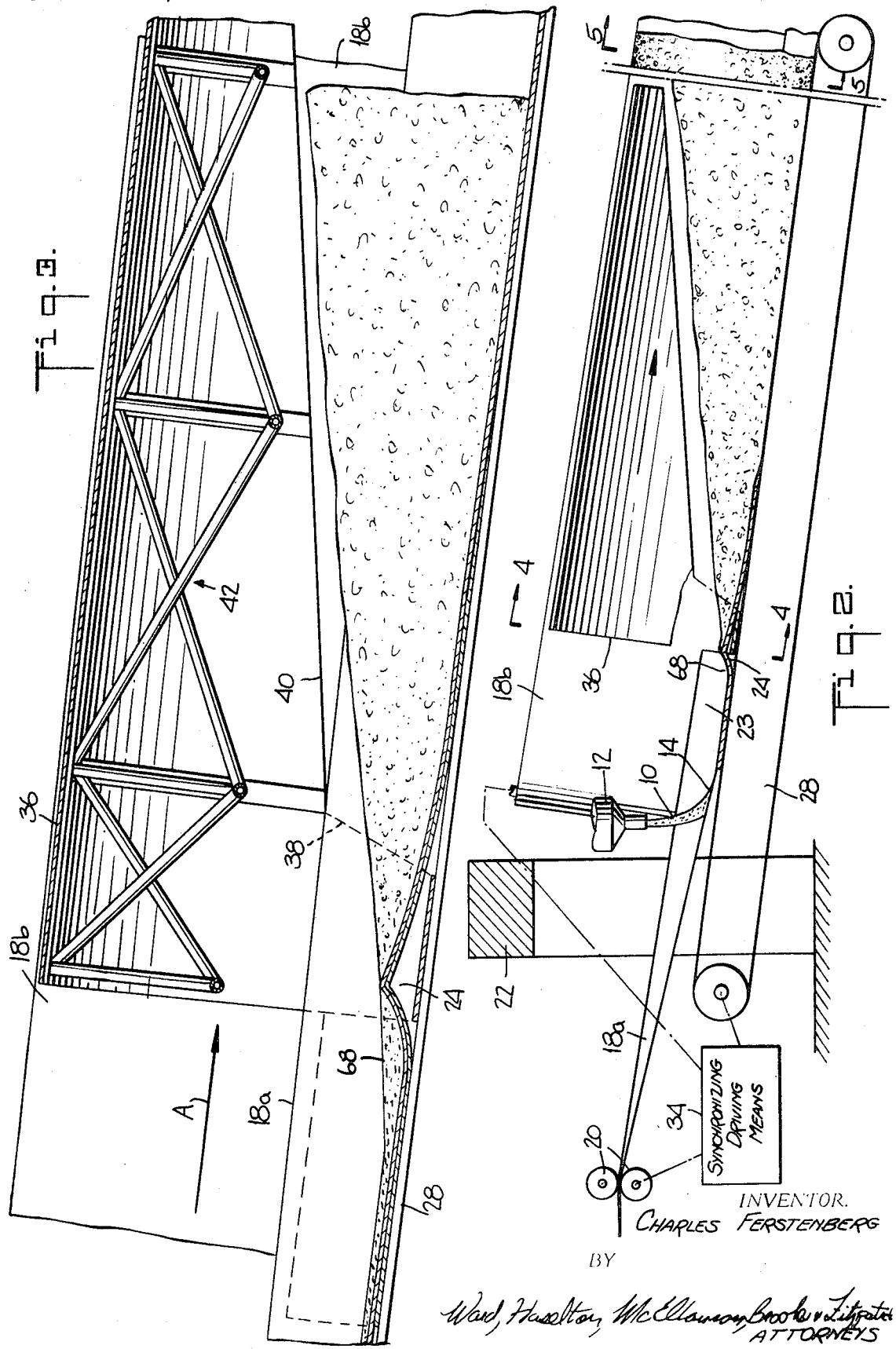

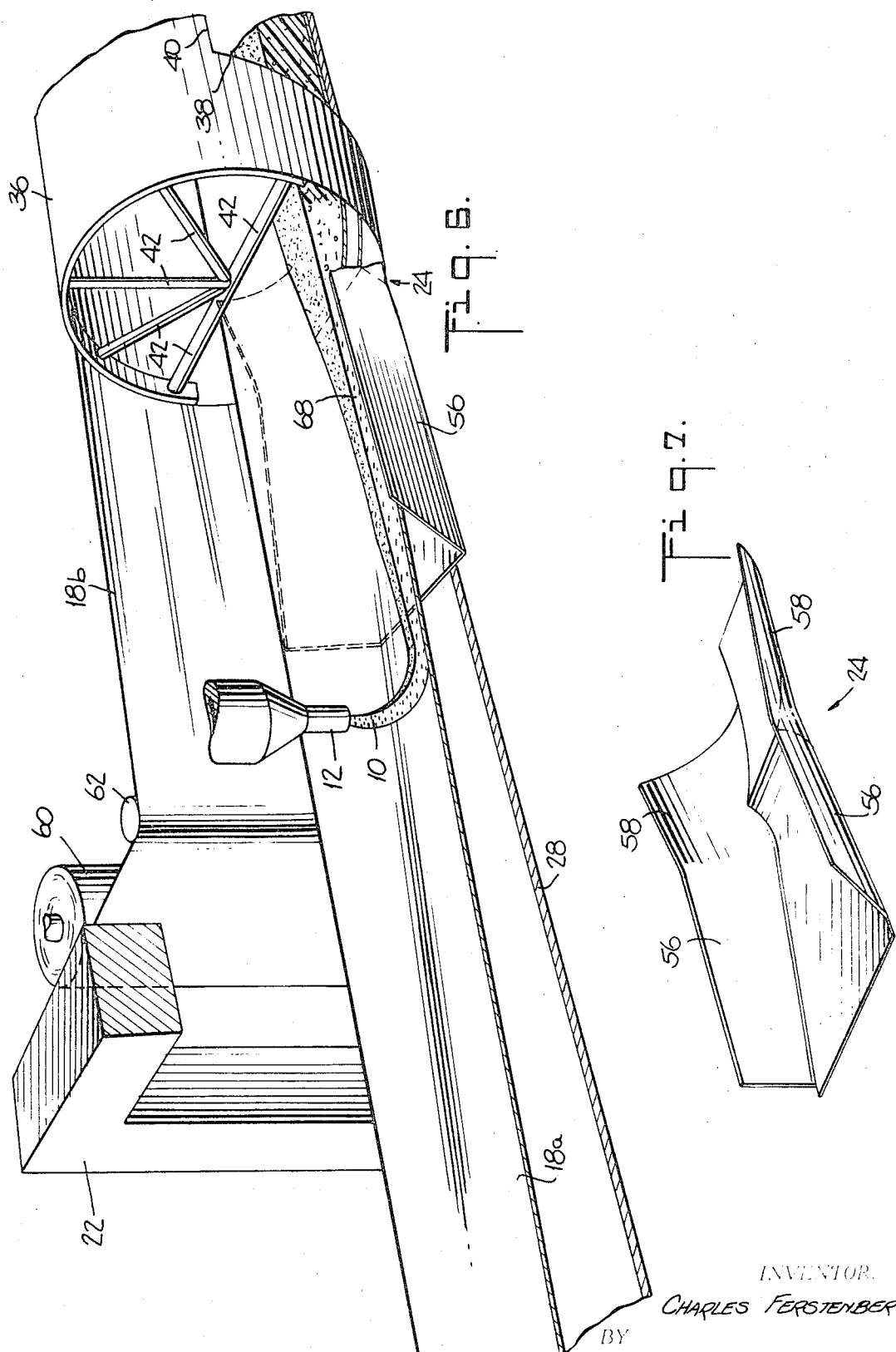

3,729,534
METHOD FOR CONTINUOUSLY FORMING ELONGATED CYLINDERS OF POLYURETHANE FOAM
Charles Ferstenberg, Paramus, N.J., assignor to Tenneco Chemicals, Inc., New York, N.Y.
Continuation of application Ser. No. 696,070, Jan. 5, 1968. This application June 1, 1970, Ser. No. 41,739
Int. Cl. B29d 27/04
U.S. Cl. 264—54        4 Claims

ABSTRACT OF THE DISCLOSURE

Contouring of flexible webs to the interior of an elongated moving molding channel by the provision of specially located and specially shaped guiding devices, by the provision of special internal mold supports and by the selective overlapping of separate web sheets.

---

This is a continuation of application Ser. No. 696,070, filed Jan. 5, 1968 and now abandoned.

This invention relates to the handling of elongated moving webs for changing the contour thereof, and more particularly it concerns novel arrangements for contouring such webs in a manner suitable for use in continuous molding operations.

The present invention is particularly advantageous in connection with continuous molding operations for the production of elongated foamed polyurethane material having a large contoured cross section, e.g. cylindrical, and an indefinite length; and in this connection the present invention, in one aspect, provides additions to the subject matter of U.S. Patents 3,281,894 and 3,296,658, assigned to the assignee of the present invention.

As described in the above-mentioned patents, large diameter cylinders of foamed polyurethane are produced by pouring a liquid reaction mixture onto a surface, such as a web of sheet material, which moves slowly and continuously away from the pouring point in a slightly inclined direction. During this movement, the web is supported and shaped, as by segmented conveyors, so that it forms a mold in the configuration of a partially closed cylinder. As the reaction mixture travels along, it is supported in different configurations and passes over different surfaces on which a series of reaction stages occur; and these are manifested in a creaming, a thickening, a foaming, a rising and a solidifying of the reactants, whereby a foamed cellular product having the shape of the mold interior is produced at a downstream or output end of the mold. The thus-produced continuous cylinder is thereafter cut into individual lengths; and these lengths are mounted on machines and rotated against a knife blade which spirally peels them into elongated sheets.

The present invention permits the production of large-cross-sectional foamed products with a smooth and fissure-free outer surface. In part, the present invention is based upon the discovery that because of the manner in which foam reactants rise, i.e. by a mushroom effect, the rising foam itself is not capable of smoothing out wrinkles in the web which carries the foam reactants. As a result the rising foam may bridge over the spaces between inwardly protruding portions of such web wrinkles and entrap air or gas in the intervening spaces. This may result in the production of fissures, gas pockets and other deformations. Moreover, such deformations would be produced at or near the outer surface of the foamed cylinder and thereby result in large material losses.

Web wrinkling results from the fact that the web, which is usually of paper (although it may be of polyethylene or similar material), is drawn off a supply roll about which it is wound, in one direction (i.e. longitudinally), and is thereafter bent to curved configuration in another direction (i.e. transversely). Additionally, the web may be required to undergo bending in several different planes simultaneously. Because of the limited flexibility and extensibility of the web, these contour changes often result in the production of wrinkles, thereby deteriorating the quality of the mold to be formed by the web.

The present invention overcomes the above-described web wrinkle problem by means of novel web guiding arrangements.

According to one aspect of the present invention, a web, for example a sheet of chemically treated release paper, is caused to be withdrawn continuously from a roll and guided along the path of movement of the reacting mixture. Special guide means are provided to change the contour of the paper from an initially flat configuration to curved or otherwise contoured configurations for shaping the rising foam. The positioning and orientation of each of the various web guiding means is selected to cause the web to undergo contour changes in a manner such that stretching variations across the web width are eliminated or at least minimized. This is achieved by guiding the web so as to provide a trajectory for each element across the web width which is of equal or nearly equal total length as the web moves from a position of one contour to a position of new contour.

According to a further aspect of the present invention, special inner and outer web support means are provided whereby the web is supported continuously on both sides thereof along substantially its entire lateral extent to prevent buckling and the wrinkles which result therefrom. In this connection, it has been discovered that when the web is merely supported externally, as by an outer channel defining support, the web will buckle if the channel is of a size and shape to cause the lateral edges of the web to form upwardly protruding walls of significant height. This buckling problem has been overcome by providing a special internal support of the same general contour as the outer support so as to define between them a slot-like channel through which the web may pass without buckling. The special internal support is specially configured so that its lower edges rise up just ahead of the upwardly rising expanding foam. Thus all along the foam-forming channel the web is supported internally in part by the foam and in further part by the internal support.

According to a still further aspect of the present invention, there are provided a plurality of individual sheets which are combined in a novel manner to form the overall foam molding web. As illustratively embodied, three separate sheets are provided, including a bottom sheet onto which the liquid reaction mixture is poured, and two side sheets which overlap slightly each of the two edges of the bottom sheet. The side sheets are guided along in a simple arc-shaped contour, while the bottom sheet undergoes variations in contour as it passes over a pouring surface, a weir, and a final configuration surface. Because of these transverse contour variations, the edges of the bottom sheet (which is of constant width) recede and extend laterally as the sheet moves along. The separate side sheets, however, are not affected by contour variations which affect the lateral positioning of the edges of the bottom sheet. The lateral movements of the bottom sheet edges are thereby easily accommodated and no wrinkles are produced since the overlapping edges of the bottom and side sheets easily slide over one another.

Various further and more specific objects, features and advantages of the invention will appear from the description given below, taken in connection with the accompanying drawings, illustrating by way of example preferred forms of the invention.

FIG. 1 is a plan view, partially cut away illustrating the main portion of a foam molding apparatus in which the present invention is embodied;

FIG. 2 is a side elevational view, also partly cut away, of the foam molding apparatus of FIG. 1;

FIG. 3 is an enlarged fragmentary view of a portion of the foam molding apparatus as shown in FIG. 2;

FIG. 6 is a fragmentary perspective view of the input portion of the foam molding apparatus of the preceding figures;

FIG. 7 is a perspective view illustrating a weir structure used in the system of FIGS. 1–6.

Figure 5:
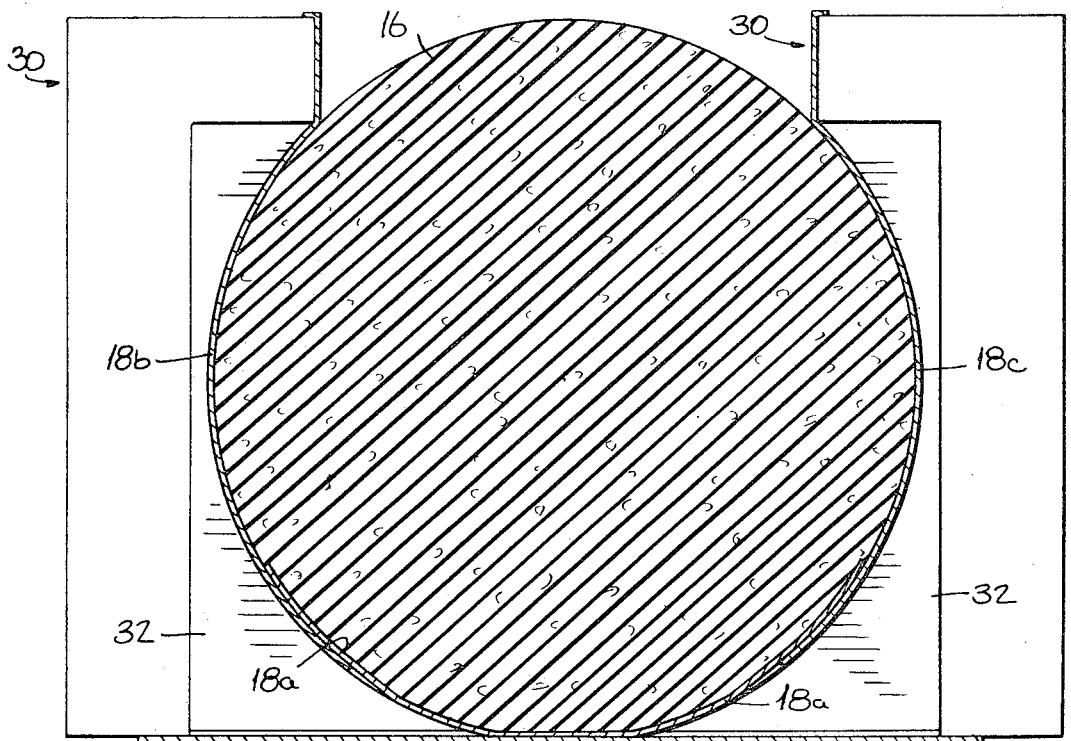
FIG. 5 is an enlarged cross-section view taken along line 5—5 of FIG. 2.

In the foam molding apparatus shown in FIGS. 1 and 2, liquid reactants 10, such as those described in the aforementioned patents, are poured down through a nozzle 12 onto a support surface 14, and are moved along on the support surface while they react to form a cellular foamed product 16. The surface 14 is formed by a paper web 18. The web 18 is a composite made up of a bottom sheet 18a and two side sheets 18b and 18c. The sheets making up the web 18 may be of paper; and they are treated with a coating which serves to permit release of the foamed product 16 after completion of the molding operation.

The bottom sheet 18a is withdrawn from a supply roll (not shown) by means of a pair of driven pinch roll 20. The sheets pass along through a portal 22 and under the nozzle 12. The portal 22 is a structure which serves to support the nozzle 12 and the various piping and other equipment appurtenant to it. From the nozzle, the sheet proceeds through an entrance guide 23 and over a weir structure 24. From there it moves along through a molding channel 26.

Figure 4:
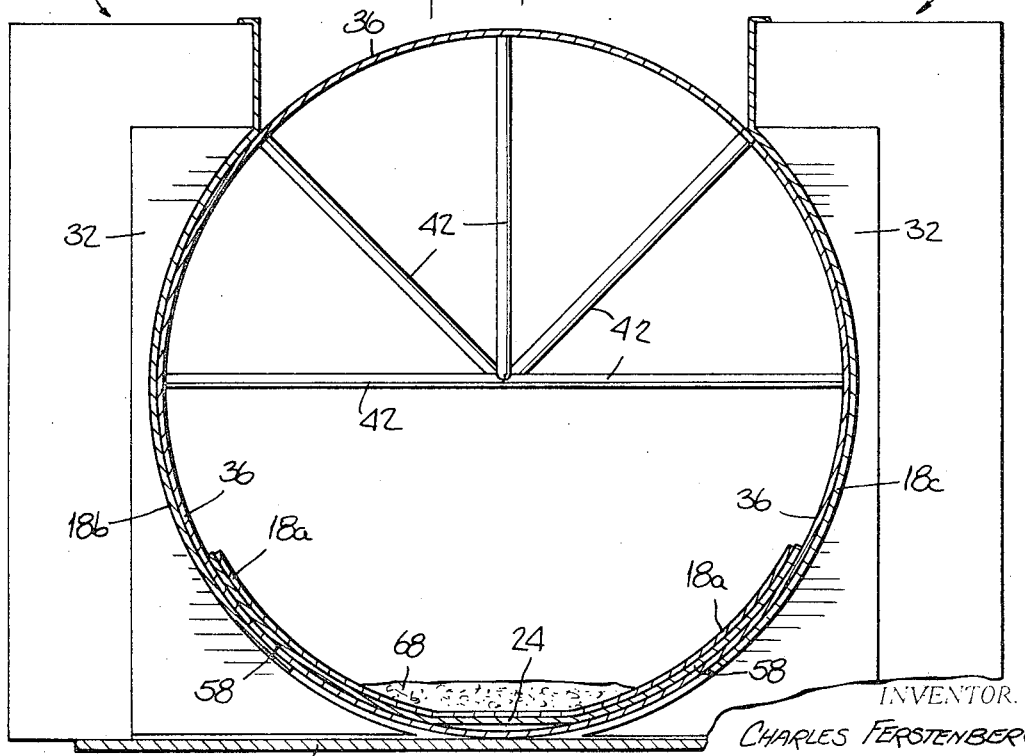
FIG. 4 is an enlarged cross-section view, taken along line 4—4 of FIG. 2.

The molding channel 26 is made up of an endless loop bottom conveyor 28 (FIG. 1), and a pair of side conveyors 30. The bottom conveyor 28 is of flat contour and provides bottom support for the molding channel. The side conveyors 30, as shown in FIG. 1, are provided with a plurality of adjacent mold segments 32 which cooperate to form a continuous support for the web 18. As shown in FIGS. 4 and 5, the segments 32 are shaped as arcs of cylinders along their surfaces defining the molding channel 26. The bottom and side conveyors 28 and 30 are driven in synchronism by synchronizing driving means 34 so that the channel 26 effectively moves continuously in the direction of an arrow A away from the nozzle 12.

A stationary internal mold support 36 is provided in the vicinity of the forward ends of the bottom and side conveyors 28 and 30. The internal mold support 36 is generally tubular in configuration; and as can be seen in FIG. 4, it fits closely inside the circular cross-section defined by the cooperating mold segments 32.

Turning now to FIG. 3, it will be seen that the mold support 36 extends rearwardly only a short distance in complete cylindrical configuration. Beyond this point it is cut away so that it tapers upwardly, first rather sharply, as indicated at 38, and then more shallowly, as indicated at 40. The upper interior portion of the mold support 36 is braced by a truss assembly 42. Means (not shown) are provided to suspend the mold support from above and to hold it in fixed position relative to the various conveyors 28 and 30.

The weir structure 24, as shown in FIGS. 3, 7 and 8, may be of sheet metal construction. As shown, it rises up in advance of the molding channel 26 to hold back a portion of the liquid reaction mixture until it has begun to gel.

Turning now to FIG. 6, it will be seen that the front or upstream end of the internal mold support 36 encircles the weir structure 24. As indicated above, the bottom sheet 18a of the web 18 passes over the weir structure 24. This situation is illustrated in FIG. 6 where the sheet 18a is shown to pass over the weir structure and into the mold support 36. The bottom sheet 18a is considerably wider than the weir structure itself. Accordingly, the edges of the sheet are bent upwardly to guide the sheet into the mold support 36. This is accomplished by means of the entrance guide 23. As shown, the entrance guide has lateral guide walls 56 and 58 which extend up in advance of and on each side of the weir structure 24. These lateral guide walls actually form a chute which forms the bottom sheet 18a into a particular configuration during its movement over the weir structure 24.

In FIG. 7 it will be seen that the chute, which is formed by the guide walls 56 and 58, is initially of trapezoidal configuration. The chute then tapers inwardly in the downstream direction, and the guide walls 56 are of greater length to accommodate the constant width of the bottom sheet 18a.

Thereafter, in the vicinity of the weir structure 24, the straight guide walls 56 blend into the curved guide walls 58. Further along, as can be seen in FIG. 6, the guide walls 58 taper outwardly in the downstream direction and eventually blend with the curved surface of the mold support 36.

Reverting to FIGS. 1, 2 and 6, the outer sheets 18b and 18c are shown to be drawn from side supply rolls 60 mounted with their axes extending in a vertical direction. The sheets 18b and 18c each pass around an associated guide roll 62. The guide rolls are slightly inclined to change the direction of motion of the sheets so that they will proceed along parallel to and in alignment with the sides of the molding channel 26.

The side sheets 18b and 18c, as shown in FIGS. 1 and 6, pass along the outside of the guide walls 56 and 58 of the weir structure 24, and along the outside of the internal mold support 26. However, they do pass through arc-shaped slots defined between the mold support 36 and the mold segments 32 of the side conveyors 30, as shown in FIG. 4. This provides lateral support on both surfaces of each of the side sheets 18b and 18c to prevent them from buckling. Thereafter, downstream of the entrance end of the mold support 36, where it tapers upwardly, the lower edges of the side sheets 18b and 18c come into overlapping contact with the lateral edges of the bottom sheet 18a, thereby forming the complete composite web which forms and supports the reacting mixture.

As indicated in FIGS. 1 and 2, the bottom sheet pinch rolls 20 and the side sheet supply rolls 60 are also synchronously driven with the conveyors 28 and 30. This serves to maintain each of the sheets 18a, 18b and 18c in uniform movement and to prevent relative movement between any of the sheets and the conveyors. Thus the imposition of stress and consequent wrinkling in the sheets is avoided.

In operation of the system, the bottom and side conveyors 28 and 30 and the bottom sheet pinch rolls 20 and the side supply rolls 60 are all driven in synchronism through the synchronizing driving means 34. The liquid reaction mixture 10 is poured out from the nozzle 12 onto the bottom sheet 18a. The liquid runs down toward the weir structure 24 and into a pool 68. It then passes over the weir and proceeds along down through the channel 26.

The initial portion of the foam rise is contained by the lateral edges of the bottom sheet 18a. Eventually, however, the foam rises beyond these lateral edges; and thereafter the side sheets 18b and 18c serve to provide the main lateral containment of the foam.

The side sheets 18b and 18c are initially supported fully on both sides by the mold segments 32 and the internal mold support 36, as shown in FIG. 4. However, as the foam rises, the mold support tapers upwardly away from it, as shown in FIG. 3. Thus the regions of the side webs vacated by the upwardly tapered internal mold support 36 are simultaneously occupied by the rising foam itself which presses the sheets out against the outer mold segments 32 before the sheets can buckle from their own weight and form wrinkles.

It will be appreciated that because of the various configurational changes which the bottom sheet 18a must undergo in passing over the weir structure 24 and into the channel 26, its lateral edges will sequentially project and recede in the lateral direction. This lateral web movement is easily accommodated in the present arrangement by virtue of the overlapping arrangement between the side and bottom sheets. The side sheets 18b and 18c thus may proceed along with a continuous curved contour and no lateral edge movement, while the lateral edge movement of the bottom sheet is readily absorbed in a greater or lesser overlapping of the adjacent sheets. In this manner the complications of transmitting lateral edge movements nearly completely around the girth of the mold, and the consequent production of web wrinkles are avoided.

Figure 8A:
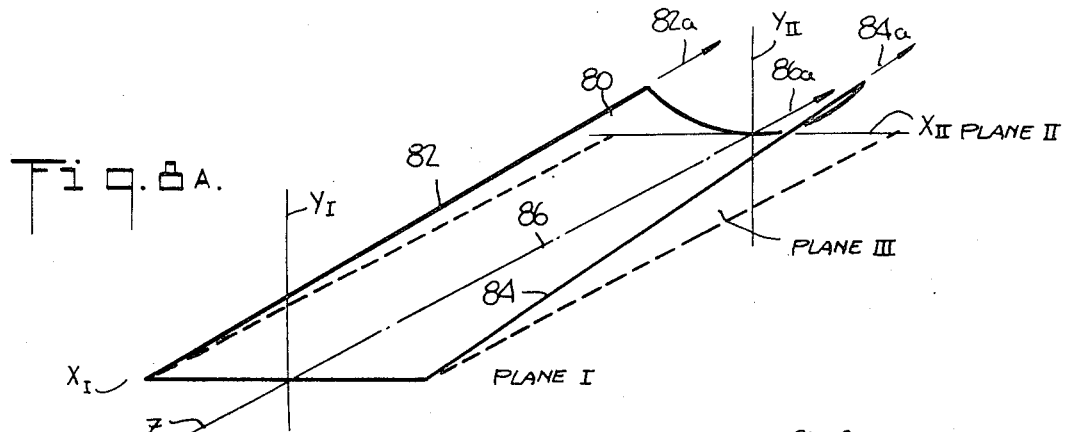
FIGS. 8A–B and FIGS. 9A–B are diagrammatic views illustrating the manner in which web wrinkling is avoided by the novel web guiding arrangements of the present invention.

FIGS. 8A–B and FIGS. 9A–B illustrate the manner in which the web handling arrangement of the present invention operates to reduce or eliminate web wrinkling during changes in its contour. As shown in FIG. 8A, a conventionally guided web 80 moves along between a pair of parallel planes I and II; and in doing so it changes from flat to curved contour. The plane I is defined by orthogonal lines $X_I$ and $Y_I$ while the plane II is defined by corresponding orthogonal lines $X_{II}$ and $Y_{II}$. The path of web movement is along a third plane III defined by a line $Z$ between planes I and II and the lines $X_I$ and $X_{II}$.

During the web movement, its outer edges 82 and 84 turn upwardly and inwardly to form the curved contour, while the center line 86 of the web proceeds along the center of plane III.

Figure 8B:
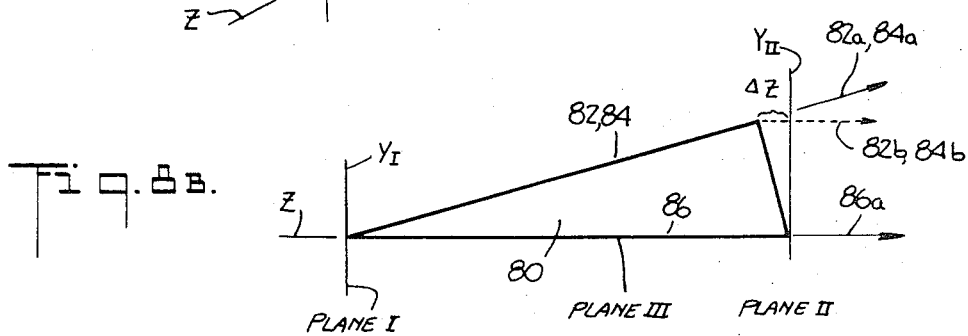

Turning now to FIG. 8B, it will be seen that the web center line 86 reaches plane II before the web edges 82 and 84. As a result of this, the web edges 82 and 84 tend to continue to diverge in an upward direction as indicated by the arrows 82a and 84a. In order to cause the web to proceed along plane III and cause the web edges to follow paths parallel to this plane, as indicated by the dotted arrow 82b, 84b, it becomes necessary to stretch the outer web edges by an amount $\Delta Z$ so that the entire web cross-section enters plane II at the same time. This, however, produces unequal stretching across the web, with none in the center and a great deal along the edges. As a result of this unequal stretching, wrinkles may develop.

Figure 9A:
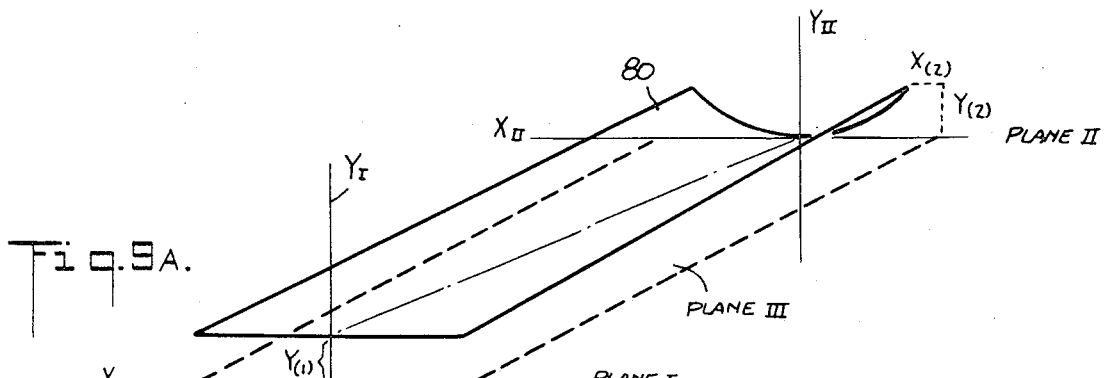
Figure 9B:
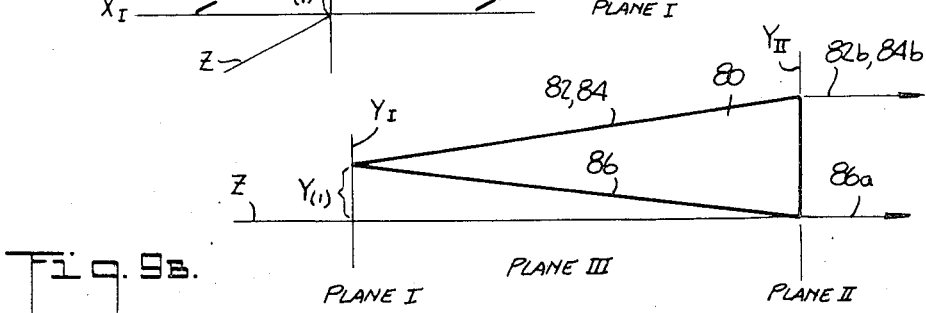

FIG. 9A illustrates web guidance in accordance with the present invention. Here, instead of changing web contour in plane III, the web 80 is caused to proceed initially from a distance $Y_{(1)}$ above plane III and to converge with it as the web contour changes. Thus in this case the web center line 86 does not reach plane III until it also reaches plane II. With this arrangement, as shown in FIG. 9B, the outer edges 82 and 84 will reach plane II at the same time so that the continual path of movement for all of the web lines 82, 84 and 86 will be in the direction of the parallel arrows 82b, 84b and 86b. The distance $Y_{(1)}$ is chosen so that the path of movement of each element across the web width from plane I to plane II will be of substantially equal length. Known gometrical methods can be used in ascertaining the displacement $Y_{(1)}$, taking into account, however, that the outer edges 82 and 84 must undergo displacements in both the X and Y directions.

The above principles are employed in connection with the modification of the contour of the bottom sheet 18a as it passes over various elevational modifications such as the weir structure 24. As can be seen from FIGS. 8A–B and FIGS. 9A–B, in order for the moving web to undergo changes in contour without wrinkling, its path of movement must change. That is, where the web edges taper inwardly in the X direction, the web center line must change its path of movement in the Y direction. Now in the case of passing over the weir structure 24, the center line of the bottom sheet 18a will change its path of movement in the Y direction. In order to prevent wrinkling, the outer edges of the web must change their path of movement in the X direction. That is, the web must taper inwardly. This inward tapering, as shown in FIGS. 6 and 7 is achieved by the entrance chute walls 56 and 58. Also, as in the previous case, the amount of this taper should be chosen to ensure that each ray or longitudinal line along the web moves along a path or trajectory which is as close as possible in length to the path or trajectory of every other longitudinal line across the web. When this occurs, differential stresses are minimized and wrinkling is eliminated.

Although a certain specific embodiment of the invention is herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. A method for continuously forming elongated cylinders of polyurethane foam having a substantially smooth, continuous surface from a liquid, polyurethane foam forming mixture, said method comprising the steps of:
   (a) forming a flexible web including a bottom sheet and two side sheets, each side sheet having a bottom edge which overlaps a lateral edge of said bottom sheet,
   (b) passing said web into a liquid mixture deposition zone and pouring continuously a predetermined charge of said liquid reaction mixture onto the said bottom sheet in a region substantially intermediate the lateral edges of said bottom sheet,
   (c) synchronously moving said sheets longitudinally away from the pouring location and through a web support region and providing in said support region external arcuate lateral support and internal cylindrical support for said side sheets and external cylindrical support for said bottom sheet, and
   (d) withdrawing ever increasing amounts of the bottom portion of said cylindrical support so that the bottom edges of said side sheets assume overlapping relationship with the bottom sheet and support the rising polyurethane foam which bears against said side and bottom sheets and presses said side sheets against said external lateral outside support before said sheets can buckle from their own weight and form wrinkles.

2. A method as in claim 1 wherein said bottom sheet is transversely contoured during its longitudinal movement so that the edges undergo lateral displacement while still maintaining the overlapping relationship with the bottom edges of said side sheets.

3. A method as in claim 2 wherein the central portion of said bottom sheet is made to move downwardly during at least a portion of the time that said cylindrical support thereof is provided, and said edges of said bottom sheet undergo lateral displacement outwardly during said time that said central portion is moving downwardly.

4. A method for changing the transverse contour of an elongated flexible web of sheet material from flat to generally cylindrical while avoiding wrinkle formation in the web as it moves generally in a longitudinal direction, said method comprising the step of gradually laterally shifting positions of edge elements in said web as central elements thereof move perpendicular to said longitudinal and lateral directions so that there is substantially no change in the relative longitudinal positions of said elements along a transverse section thereof as said web moves longitudinally, said shifting being such that edge elements shift outwardly as center elements move downwardly.

References Cited

UNITED STATES PATENTS

| | | | |
|---|---|---|---|
| 3,325,573 | 6/1967 | Boon et al. | 18—5 P X |
| 3,496,596 | 2/1970 | Buff | 264—54 UX |
| 3,093,232 | 6/1963 | Kornylak | 264—45 X |
| 3,152,361 | 10/1964 | Edwards | 18—4 B |

PHILIP E. ANDERSON, Primary Examiner

U.S. Cl. X.R.

264—216, 313